United States Patent
Liu et al.

(10) Patent No.: US 11,296,746 B2
(45) Date of Patent: Apr. 5, 2022

(54) METHOD FOR SELECTING SPREADING SEQUENCES, A METHOD FOR ADJUSTING A TRANSMISSION POWER AND COMMUNICATION APPARATUSES

(71) Applicant: NTT DOCOMO, INC., Tokyo (JP)

(72) Inventors: Wenjia Liu, Beijing (CN); Xiaolin Hou, Beijing (CN); Qin Mu, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/650,820

(22) PCT Filed: Sep. 11, 2018

(86) PCT No.: PCT/CN2018/105027
§ 371 (c)(1),
(2) Date: Mar. 25, 2020

(87) PCT Pub. No.: WO2019/062540
PCT Pub. Date: Apr. 4, 2019

(65) Prior Publication Data
US 2020/0235776 A1    Jul. 23, 2020

(30) Foreign Application Priority Data
Sep. 30, 2017 (CN) .......................... 201710923349.6

(51) Int. Cl.
*H04B 1/69* (2011.01)
*H04W 52/24* (2009.01)
*H04W 52/34* (2009.01)

(52) U.S. Cl.
CPC ............ *H04B 1/69* (2013.01); *H04W 52/242* (2013.01); *H04W 52/34* (2013.01)

(58) Field of Classification Search
CPC ....... H04B 1/69; H04J 13/16; H04W 72/0466
See application file for complete search history.

(56) References Cited

U.S. PATENT DOCUMENTS

2006/0098679 A1   5/2006  Cheng et al.
2019/0052309 A1*  2/2019  Schmidt .............. H04J 13/0003

FOREIGN PATENT DOCUMENTS

CN    102045823 A    5/2011
CN    107171770 A    9/2017

OTHER PUBLICATIONS

3GPP TSG RAN WG1 Meeting AH 1801; R1-1800686 "NOMA scheme with user grouping" NTT Docomo, Inc.; Vancouver, Canada; Jan. 22-26, 2018 (6 pages).

(Continued)

*Primary Examiner* — Betsy Deppe
(74) *Attorney, Agent, or Firm* — Osha Bergman Watanabe & Burton LLP (57) ABSTRACT

Provided in embodiments of the present disclosure are a method for selecting spreading sequences, a method for adjusting a transmission power and communication apparatuses. The method for selecting spread sequences according to the embodiments of the present disclosure includes: obtaining received powers of a plurality of user groups at a receiving end; determining spread sequence groups for the user groups in a spreading sequence set according to the obtained received powers.

6 Claims, 4 Drawing Sheets

(56) References Cited

OTHER PUBLICATIONS

3GPP TSG RAN WG1 Meeting #86; R1-166871 "NoMA scheme based on NCMA" LG Electronics; Gothenburg, Sweden; Aug. 22-26, 2016 (4 pages).
International Search Report issued in International Application No. PCT/CN2018/105027, dated Nov. 21, 2018 (7 pages).

* cited by examiner

METHOD FOR SELECTING SPREADING SEQUENCES, A METHOD FOR ADJUSTING A TRANSMISSION POWER AND COMMUNICATION APPARATUSES

CROSS-REFERENCE TO RELATED APPLICATIONS

This application is a 371 U.S. National Phase of International Application No. PCT/CN2018/105027, filed on Sep. 11, 2018, which claims priority to Chinese Application No. 201710923349.6, filed on Sep. 30, 2017. The entire disclosures of the above applications are incorporated herein by reference.

TECHNICAL FIELD

The present disclosure relates to a field of wireless communication, and in particular to a method for selecting spreading sequences, a method for adjusting a transmission power and communication apparatuses.

BACKGROUND

Non-orthogonal multiple access (NOMA) is a wireless access technology proposed in LTE (Long Term Evolution) release 13 studied by 3GPP (3rd Generation Partnership Project). In a current NOMA system, multiple mobile stations may be distinguished by transmission powers, so that data of different mobile stations are multiplexed in a same sub-band for transmission when transmitting uplink data, thereby increasing the number of mobile stations that a wireless base station can schedule simultaneously.

On the other hand, in the NOMA system, received information is decoded in a Successive Interference Cancellation (SIC) manner at a receiving end. According to the SIC manner, the receiving end firstly decodes information with the highest received power when demodulating signals, and deletes the information with the highest received power after decoding this part of information, and then decodes information with a received power with the second highest received power, and so on. That is, decoding is performed according to received powers of received information at the receiving end. However, in the current NOMA system, differences between their transmission powers are merely considered when a plurality of mobile stations are distinguished. However, power differences at a transmitting end are not equal to power differences at the receiving end due to factors such as differences of path losses, which may result in a poor performance at the receiving end.

SUMMARY OF THE DISCLOSURE

According to one aspect of the present disclosure, a method for selecting spreading sequences is provided, comprising: obtaining received powers of a plurality of user groups at a receiving end; determining spreading sequence groups for the user groups in a spreading sequence set according to the obtained received powers.

According to another aspect of the present disclosure, a method for adjusting a transmission power is provided and applied to a mobile station, comprising: determining, according to a reference signal received power of the mobile station, a user group to which the mobile station belongs; adjusting a transmission power of the mobile station according to a received power of the determined user group at a receiving end.

According to another aspect of the present disclosure, a communication apparatus is provided, comprising: an obtaining unit configured to obtain received powers of a plurality of user groups at a receiving end; a determining unit configured to determine spreading sequence groups for the user groups in a spreading sequence set according to the obtained received powers.

According to another aspect of the present disclosure, a communication apparatus is provided, comprising: a group determining unit configured to determine, according to a reference signal received power of a mobile station, a user group to which the mobile station belongs; and an adjusting unit configured to adjust a transmission power of the mobile station according to a received power of the determined user group at a receiving end.

BRIEF DESCRIPTION OF THE DRAWINGS

The above and other objects, features and advantages of the present disclosure will become clearer by describing embodiments of the present disclosure in details with reference to the accompanying drawings.

DESCRIPTION OF THE EMBODIMENTS

A method for selecting spreading sequences, a method for adjusting a transmission power and communication apparatuses according to the embodiments of the present disclosure will be described below with reference to the accompanying drawings. Like reference numerals refer to like elements throughout the accompanying drawings. It should be understood that the embodiments described herein are merely illustrative and should not be construed as limiting the scope of the present disclosure. Furthermore, a UE described herein may include various types of user terminals, for example, a mobile terminal (or referred to as a mobile station) or a fixed terminal. However, for convenience, the UE and the mobile station sometimes may be used interchangeably hereinafter.

Figure 1:
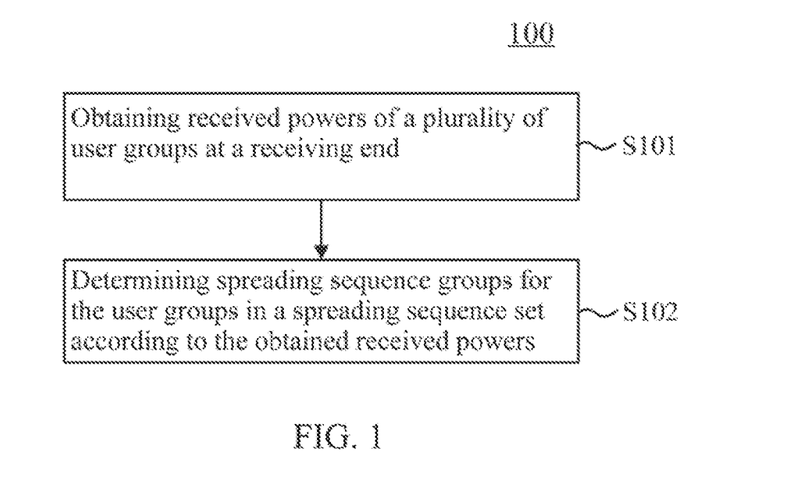
FIG. 1 is a flowchart illustrating a method for selecting spreading sequences according to one embodiment of the present disclosure.

A method for selecting spreading sequences according to one embodiment of the present disclosure will be described below with reference to FIG. 1. FIG. 1 is a flowchart illustrating the method 100 for selecting spreading sequences according to one embodiment of the present disclosure. According to one example of the present disclosure, the method 100 for selecting spreading sequences may be used for a communication apparatus in a communication system that receives by means of Successive Interference Cancellation (SIC) or other ways, for example, a communication apparatus in a NOMA system.

As shown in FIG. 1, in step S101, received powers of a plurality of user groups at a receiving end is obtained. In the embodiments according to the present disclosure, mobile stations are grouped by received powers of information transmitted by the mobile stations at the receiving end. For example, data from mobile stations of different groups may be transmitted by using the same time and/or frequency resources.

Herein, a received power of a user group at the receiving end may be a preconfigured received power that the user group should achieve at the receiving end. Furthermore, according to one example of the present disclosure, parameters such as the number of the user groups and/or the number of mobile stations included in each user group may be preconfigured.

In step S102, spreading sequence groups for the user groups may be determined in a spreading sequence set according to the obtained received powers. For example, the spreading sequence set may be preconfigured. In this embodiment, the spreading sequence set used to determine spreading sequences may also be referred to as a spreading sequence matrix or a codebook of spreading sequences. Alternatively, the spreading sequence set used to determine spreading sequences may also be referred to as a code book of spreading sequences, a codebook, a spreading sequence pool or a sequence pool. Accordingly, a spreading sequence determined according to the spreading sequence set may also be referred to as a codeword or a signature.

According to one example of the present disclosure, in step S102, the spreading sequence groups for the user groups may be determined in the spreading sequence set according to differences between the received powers of the respective user groups. Specifically, when the differences between the received powers of the respective user groups at the receiving end are greater than or equal to a predetermined value, in step S102, according to interference caused by respective sequences of the spreading sequence set to users of one user group, respectively, a spreading sequence group for the user group may be selected from the spreading sequence set. That is, a specific user of one user group may be configured to use a specific spreading sequence of the spreading sequence set for transmission, and according to interference caused to users of the specific user group in the case of sequences other than the specific spreading sequence of the spreading sequence set respectively being used for transmission, spreading sequences for the user group may be selected from the spreading sequence set. According to one example of the present disclosure, a spreading sequence with less interference to the specific user may be selected together with the spreading sequence used by the specific user as spreading sequences of the spreading sequence group for the user group.

For example, for a specific sequence in the spreading sequence set, correlations between other sequences of the spreading sequence set and the specific sequence may be obtained respectively, and a sequence with a low correlation with the specific sequence is selected together with the specific sequence to form a spreading sequence group for one user group.

In the above examples, since the differences between the received powers of the respective user groups are large enough, the receiving end may ignore signals transmitted by mobile stations of user groups with low received powers when decoding, and extract signals transmitted by mobile stations of user groups with high received powers. Therefore, when spreading sequences are selected, it is merely considered that correlations between spreading sequences included in a spreading sequence group for one user group are low, and effect from spreading sequences included in spreading sequence groups for other user groups may be ignored.

On the other hand, when the differences between the received powers of the respective user groups at the receiving end are less than or equal to the predetermined value, since the differences between the received powers of the respective user groups may not be large enough, the receiving end cannot ignore signals transmitted by mobile stations of user groups with low received powers when decoding. Therefore, when spreading sequences are selected, effect from spreading sequences included in spreading sequence groups for other user groups cannot be ignored.

Specifically, when the differences between the received powers of the respective user groups at the receiving end are less than or equal to the predetermined value, in step S102, according to a sum of interference caused by a plurality of sequences of the spreading sequence set to users in one user group, spreading sequences of a spreading sequence group for the user group may be selected from the spreading sequence set. That is, a specific user of one user group may be configured to use a specific spreading sequence of the spreading sequence set for transmission, and according to a sum of interference caused to users of the specific user group in the case of sequences other than the specific spreading sequence of the spreading sequence set being used for transmission, spreading sequences for the user group may be selected from the spreading sequence set.

For example, for each spreading sequence in the spreading sequence set, a sum of interference of the other sequences of the spreading sequence set on the spreading sequence may be obtained, and according to a received power of the user group at the receiving end and the sum of interference, spreading sequences of a spreading sequence group for the user group may be determined. For example, a user group with a large received power at the receiving end may be allocated with a spreading sequence on which a sum of interference of the other sequences of the spreading sequence set is small.

According to one example of the present disclosure, the specific spreading sequence of the spreading sequence set configured to be used by the specific user of one user group may be a spreading sequence selected from spreading sequences obtained by excluding spreading sequences for user groups with higher received powers than this user group from the spreading sequence set. That is, preferably, in this example, spreading sequences for user groups are selected sequentially in order of received powers from large to small. For any user group, selection may be made from spreading sequences in the spreading sequence set other than spreading sequence groups for user groups with higher received powers than the user group. Furthermore, when the sum of interference caused by a plurality of sequences of the spreading sequence set to users in one user group is determined, preferably, only a sum of interference on one specific sequence from spreading sequences other than spreading sequence groups for user groups with higher received powers than the user group may be determined.

In the following, an example of a specific spreading sequence set will be used to respectively describe the case of selecting spreading sequences for user groups when differences between received powers of the respective user groups are large enough, and the case of selecting spreading sequences for user groups when differences between received powers of the respective user groups are not large enough.

For example, the spreading sequence set S may be as shown in the following Formula 1:

$$S = \begin{bmatrix} -3 & -i & -1 & -3+i & -3-i & 1-i \\ 3 & 3-i & -3-i & -2+i & 0 & -3i \\ -3 & 0 & -2-2i & 2+i & 3+2i & 0 \\ 3 & 2-3i & -2-2i & 1-i & -1 & 3i \end{bmatrix} D_{nor} \quad (1)$$

where each column in the columns of Formula 1 is a spreading sequence, and $D_{nor}$ is a diagonal matrix and the diagonal elements thereof, respectively, are the inverses of the norm of each column vector of the matrix on the left.

Correlations between respective spreading sequences of the spreading sequence set S may be calculated, as shown in the following Formula (2):

$$|S^H S| = \begin{matrix} 1.0000 & 0.5000 & 0.1291 & 0.5701 & 0.2500 & 0.2887 \\ 0.5000 & 1.0000 & 0.6758 & 0.4301 & 0.1677 & 0.1291 \\ 0.1291 & 0.6758 & 1.0000 & 0.4655 & 0.2661 & 0.2108 \\ 0.5701 & 0.4301 & 0.4655 & 1.0000 & 0.1118 & 0.3512 \\ 0.2500 & 0.1677 & 0.2661 & 0.1113 & 1.0000 & 0.1443 \\ 0.2887 & 0.1291 & 0.2108 & 0.3512 & 0.1443 & 1.0000 \end{matrix} \quad (2)$$

In this example, assume that there are 3 user groups and that there are 2 mobile stations in each user group. When differences between received powers of the respective user groups are large enough, as described above, for a specific sequence of the spreading sequence set, correlations between other sequences of the spreading sequence set and the specific sequence may be obtained respectively, and a sequence with a low correlation with the specific sequence is selected together with the specific sequence to form a spreading sequence group for one user group.

According to the above Formula 2, correlations between the second to fifth spreading sequences and the first spreading sequence are 0.5000, 0.1291, 0.5701, 0.2500, and 0.2887, respectively. Among them, correlation between the third spreading sequence and the first spreading sequence is the smallest, which is 0.1291. Therefore, the first spreading sequence and the third spreading sequence are selected as spreading sequences of a first spreading sequence group. In addition, correlation between the second spreading sequence and the sixth spreading sequence is the smallest, which is 0.1291. Therefore, the second spreading sequence and the sixth spreading sequence are selected as spreading sequences of a second spreading sequence group. In addition, correlation between the fourth spreading sequence and the fifth spreading sequence is the smallest, which is 0.1118. Therefore, the fourth spreading sequence and the fifth spreading sequence are selected as spreading sequences of a third spreading sequence group. Each of the user groups may be allocated with one of the first to third spreading sequence groups.

In the case where the differences of the received powers of the respective user groups are not large enough, as described above, for each spreading sequence of the spreading sequence set, a sum of interference of other sequences of the spreading sequence set on the spreading sequence may be obtained respectively, and a user group with a high received power at the receiving end may be allocated with a spreading sequence on which a sum of interference of the other sequences of the spreading sequence set is small. Furthermore, as described above, when a spreading sequence group for a user group with a low received power is determined, a spreading sequence that has been selected for the user group with a high received power may be excluded from the spreading sequence set.

For example, in the above Formula 2, the sum of interference of other sequences on the first spreading sequence is the sum of other elements except the first element 1.000 in the first line of the formula in Formula 2. According to the above Formula 2, in the first to sixth spreading sequences, the sum of interference of other sequences on the fifth spreading sequence and the sixth spreading sequence are small. Assume that the received power of a first user group of the three user groups at the receiving end is high, the received power of a second user group at the receiving end is medium, and the received power of a third user group at the receiving end is low. As described above, it is preferred to determine, for the first user group that has a high received power at the receiving end, a spreading sequence group including spreading sequences on which the sum of interference of other sequences are small, that is, a spreading sequence group including the fifth spreading sequence and the sixth spreading sequence. Then, the fifth spreading sequence and the sixth spreading sequence are deleted from the spreading sequence set. And according to the above formula 2, in the first to fourth spreading sequences, the sum of interference of other three sequences in the set except the fifth spreading sequence and the sixth spreading sequence on the first spreading sequence and the third spreading sequence are small. Therefore, a spreading sequence group including the first spreading sequence and the third spreading sequence is determined for the second user group with a medium received power at the receiving end. Finally, a spreading sequence group including the second spreading sequence and the fourth spreading sequence is determined for the third user group with a low receiver power at the receiving end.

The above description has been made by taking the example that the number of mobile stations included in each user group is the same and the number of spreading sequences included in each spreading sequence group is the same. Alternatively, according to another example of the present disclosure, the number of mobile stations included in a user group with a low received power at the receiving end may be greater than the number of mobile stations included in a user group with a high received power at the receiving end, accordingly, a spreading sequence group for a user group with a low received power may include more spreading sequences than a spreading sequence group for a user group with a high received power.

In the examples described above in conjunction with FIG. 1, by grouping mobile stations with received powers at the receiving end, power differences between user groups may be utilized more effectively when received information is decoded at the receiving end, thereby improving reception performance.

Furthermore, according to another embodiment of the present disclosure, a transmission power of a mobile station may also be adjusted to control a received power of information transmitted by the mobile station at the receiving end, thereby further improving performance of a receiver.

Figure 2:
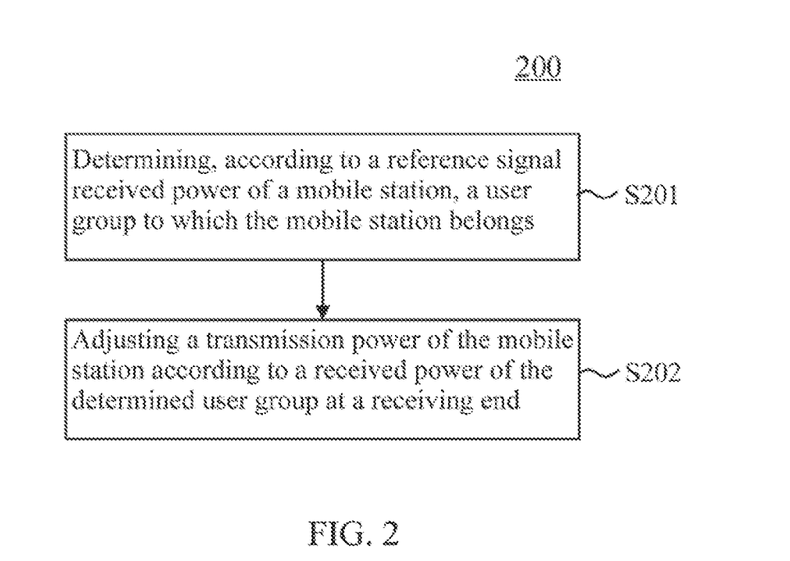
FIG. 2 is a flowchart illustrating a method for adjusting a transmission power according to one embodiment of the present disclosure.

A method for adjusting a transmission power according to one embodiment of the present disclosure will be described below with reference to FIG. 2. FIG. 2 is a flowchart illustrating the method 200 for adjusting a transmission power according to one embodiment of the present disclosure. According to one example of the present disclosure, the method 200 for adjusting a transmission power may be used for a communication apparatus in a communication system that receives by means of Successive Interference Cancellation (SIC), maximum likelihood, Message Passing Algorithms (MPAs) and the like, for example, a communication apparatus in a NOMA system.

As shown in FIG. 2, in step S201, a user group to which a mobile station belongs is determined according to a reference signal received power (RSRP) of the mobile station. According to one example of the present disclosure, a path loss of the mobile station may be determined according to the reference signal received power of the mobile station. Then, the user group to which the mobile station belongs is determined according to the path loss.

Furthermore, when the user group to which the mobile station belongs is determined in step S201, received powers of respective user groups at a receiving end may not be considered, or may be considered. Herein, a received power of a user group at the receiving end may be a preconfigured received power that information transmitted by mobile stations of the user group should achieve at the receiving end. For example, when a mobile station determines, according to RSRP, that a received power of a specific user group of a plurality of user groups at the receiving end can be achieved, in step S201, it may be determined that the mobile station belongs to the specific user group. As another example, when a mobile station determines, according to RSRP, that received powers of two or more user groups of a plurality of user groups at the receiving end can be achieved, in step S201, one of the two or more user groups may be selected as the particular user group the mobile station belongs to.

Then, in step S202, the transmission power of the mobile station is adjusted according to a received power of the determined user group at the receiving end. According to one example of the present disclosure, the method shown in FIG. 2 may be used for a base station, that is, the base station controls transmission powers of respective mobile stations connected to the base station. As shown in FIG. 2, the base station may determine a user group to which one UE belongs according to a reference signal received power of the UE, or according to a reference signal received power of the UE and received powers of other mobile stations connected to the base station, and generate power adjustment information for indicating to adjust the transmission power of the mobile station according to the determined user group. The mobile station receives the power adjustment information from the base station, and adjusts its transmission power according to the received power adjustment information.

According to another example of the present disclosure, the method shown in FIG. 2 may be used for a mobile station, that is, the mobile station controls its own transmission power according to its reference signal received power (RSRP). As shown in FIG. 2, the UE may determine a user group to which the UE belongs according to its reference signal received power, and adjust its transmission power according to the determined user group.

Furthermore, according to another example of the present disclosure, in step S202, the transmission power of the mobile station may be adjusted by one or more parameters such as a group adjustment power, a mobile station adjustment power, a path loss compensation factor, a correction factor, and power adjustment information.

Figure 3:
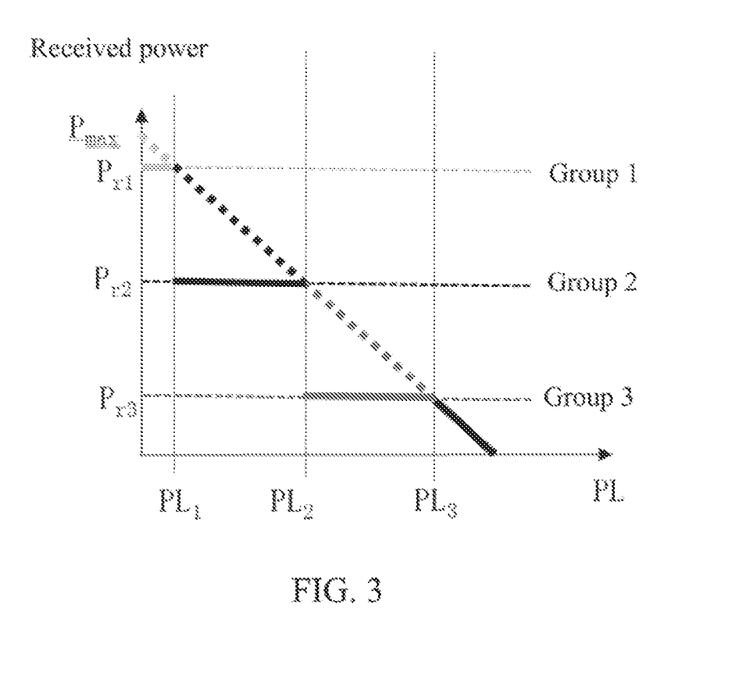
FIG. 3 is a schematic diagram illustrating preconfigured received powers that respective user groups should achieve at a receiving end according to one example of the present disclosure.
Figure 4:
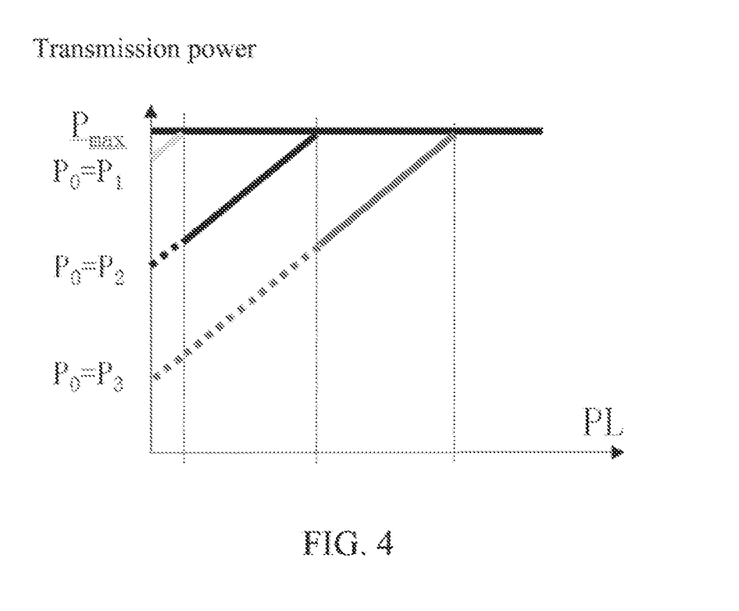
FIG. 4 is a schematic diagram illustrating transmission powers that mobile stations of corresponding groups should use so that the respective user groups should achieve the received powers shown in FIG. 3 at the receiving end according to one example of the present disclosure.

For example, in order to realize received powers that respective user groups should achieve at the receiving end, a group adjustment power may be determined for each user group to adjust transmission powers of mobile stations in the user group. FIG. 3 is a schematic diagram illustrating preconfigured received powers that respective user groups should achieve at the receiving end according to one example of the present disclosure. In the example shown in FIG. 3, there are three user groups, PL1-PL3 are the maximum path losses of user groups 1-3, and solid-line segments corresponding to Pr1-Pr3 are received powers of user groups 1-3. Pmax is the maximum transmission power. FIG. 4 is a schematic diagram illustrating transmission powers that mobile stations of corresponding groups should use for the received powers shown in FIG. 3 that the respective user groups should achieve at the receiving end according to one example of the present disclosure. Specifically, in FIG. 4, solid-line segments corresponding to Pt1-Pt3 are transmission powers that user groups 1-3 should have at different path losses in order to achieve the received powers Pr1-Pr3.

In the examples shown in FIG. 3 and FIG. 4, according to step S202, a group adjustment power $P_{0\_Group}$ may be determined according to the determined user group. Then, the transmission power of the mobile station is adjusted according to the group adjustment power $P_{0\_Group}$.

For example, the group adjustment power $P_{0\_Group}$ for a specific group n may be determined by the following formula 3:

$$P_{0\_Group}=P_n \leq P_{max} \tag{3}$$

where $P_{max}$ is the maximum transmission power, and $P_n$ is a received power of the group n at the receiving end.

Furthermore, according to one example of the present disclosure, for a user group including cell-center users, the value range of $P_{0\_Group}$ may be set to [−126, 24] dBm. For other user groups, the value range of $P_{0\_Group}$ may be set to [−126, 24]−(n−1)*$P_{gap}$ dBm, where $P_{gap}$ is power difference between adjacent user groups.

In addition to adjusting the transmission power of the mobile station based on the group adjustment power described above, the transmission power of the mobile station may be further adjusted by a mobile station adjustment power based on a path loss of the mobile station itself. According to one example of the present disclosure, the method shown in FIG. 2 may comprise determining a mobile station adjustment power according to the path loss of the mobile station, and then adjusting the transmission power of the mobile station according to the mobile station adjustment power. For example, the mobile station adjustment power $P_{0\_UE}$ may be determined by the following Formula 4:

$$P_{0\_UE}=(1-\alpha) \cdot PL \tag{4}$$

where $\alpha$ is a path loss compensation factor, $0 \leq \alpha \leq 1$, and PL is the path loss of the mobile station. According to one example of the present disclosure, the path loss compensation factor $\alpha=1$ may be defaulted for the above group adjustment power $P_{0\_Group}$. Therefore, when $\alpha<1$, power differences between adjacent user groups may be compensated by $P_{0\_UE}$.

Furthermore, according to another example of the present disclosure, in step S202, the transmission power of the mobile station may be adjusted according to the path loss compensation factor. Specifically, in step S202, the path loss compensation factor for the mobile station may be determined according to the received power of the user group to which the mobile station belongs at the receiving end and the path loss of the mobile station. Then, the transmission power of the mobile station is adjusted according to the path loss compensation factor. For example, the path loss compensation factor α may be determined by the following Formula 5:

$$\alpha = 1 - \frac{P_0 - P_n}{PL} \quad (5)$$

where $P_0$ is a nominal power, which may be preconfigured. As shown in the above formula 5, the path loss compensation factor α may be determined according to a given nominal power and path loss of the UE. Furthermore, according to one example of the present disclosure, α may be continuously varied within a range of [0, 1]. Alternatively, a value set of α may also be preconfigured. In step S202, a selection may be made within a determined value set of α (for example, by Formula 5) to obtain the final value of α. According to one example of the present disclosure, a same value set of α, for example, {0, 0.1, 0.2, 0.3, 0.4, 0.5, 0.6, 0.7, 0.8, 0.9, 1} may be set for all users. Alternatively, different value sets of α may be set for different user groups. For example, for cell-center user groups, the value set of α may be set as {0, 0.1, 0.2, 0.3, 0.4, 0.5, 0.6}, for cell-edge user groups, the value set of α may be set as {0, 0.1, 0.2, 0.3, 0.4, 0.5, 0.6, 0.7, 0.8, 0.9, 1}, and for the remaining users, the value set of α may be set as {0, 0.1, 0.2, 0.3, 0.4, 0.5, 0.6, 0.7, 0.8}.

Furthermore, according to another example of the present disclosure, the method shown in FIG. 2 may further comprise obtaining a received power of a user group adjacent to the user group to which the mobile station belongs at the receiving end. In step S202, the transmission power of the mobile station may be adjusted according to the received power of the determined user group at the receiving end and the path loss of the mobile station. For example, for a given nominal power and a given path loss compensation factor, a correction factor may be determined according to the received power of the determined user group at the receiving end and the path loss of the mobile station to adjust the transmission power of the mobile station.

Furthermore, according to another example of the present disclosure, the base station may also transmit power adjustment information to the UE according to a situation of the UE, to further adjust the transmission power of the UE. Specifically, the method shown in FIG. 2 may further comprise receiving the power adjustment information transmitted by the base station, and adjusting the transmission power of the mobile station according to the power adjustment information.

In the examples described above in conjunction with FIGS. 2-4, by adjusting the transmission power of the mobile station according to received powers of user groups at the receiving end, power differences between user groups may be utilized more effectively when received information is decoded at the receiving end, thereby improving reception performance.

Figure 5:
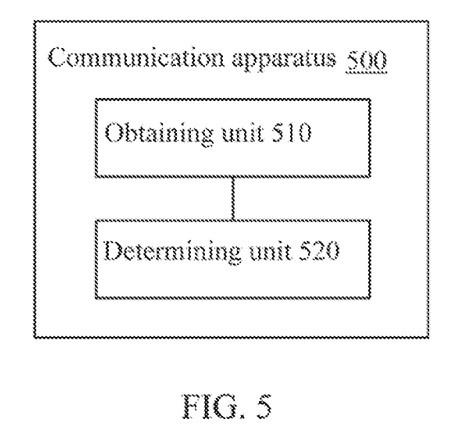
FIG. 5 is a block diagram illustrating a communication apparatus according to one embodiment of the present disclosure.

A communication apparatus according to one embodiment of the present disclosure will be described below with reference to FIG. 5. In the embodiment according to the present disclosure, the communication apparatus may be a mobile station, a base station, or the like. FIG. 5 is a block diagram illustrating a communication apparatus 500 according to one embodiment of the present disclosure. As shown in FIG. 5, the communication apparatus 500 comprises an obtaining unit 510 and a determining unit 520. The communication apparatus 500 may comprise other components in addition to these two units, however, since these components are not related to the content of the embodiments of the present disclosure, illustration and description thereof are omitted herein. Furthermore, since specific details of the following operations performed by the communication apparatus 500 according to the embodiment of the present disclosure are the same as those described above with reference to FIG. 1 and Formulas 1 and 2, repetitive description of the same details are omitted herein to avoid repetition.

As shown in FIG. 5, the obtaining unit 510 obtains received powers of a plurality of user groups at a receiving end. In the embodiments according to the present disclosure, mobile stations are grouped by received powers of information transmitted by the mobile stations at the receiving end. For example, data from mobile stations of different groups may be transmitted by using the same time and/or frequency resources.

Herein, a received power of a user group at the receiving end may be a preconfigured received power that the user group should achieve at the receiving end. Furthermore, according to one example of the present disclosure, parameters such as the number of the user groups and/or the number of mobile stations included in each user group may be preconfigured.

The determining unit 520 may determine spreading sequence groups for the user groups in a spreading sequence set according to the obtained received powers. For example, the spreading sequence set may be preconfigured. In this embodiment, the spreading sequence set used to determine spreading sequences may also be referred to as a spreading sequence matrix or a codebook of spreading sequences. Alternatively, the spreading sequence set used to determine spreading sequences may also be referred to as a code book of spreading sequences, a codebook, a spreading sequence pool or a sequence pool. Accordingly, a spreading sequence determined according to the spreading sequence set may also be referred to as a codeword or a signature.

According to one example of the present disclosure, the determining unit 520 may determine spreading sequence groups for the user groups in the spreading sequence set according to differences between the received powers of the respective user groups. Specifically, when the differences between the received powers of the respective user groups at the receiving end are greater than or equal to a predetermined value, the determining unit 520 may select, according to interference caused by respective sequences of the spreading sequence set to users of one user group, respectively, a spreading sequence group for the user group from the spreading sequence set. That is, a specific user of one user group may be configured to use a specific spreading sequence of the spreading sequence set for transmission, and according to interference caused to users of the specific user group in the case of sequences other than the specific spreading sequence of the spreading sequence set respectively being used for transmission, spreading sequences for the user group may be selected from the spreading sequence set. According to one example of the present disclosure, a spreading sequence with less interference to the specific user may be selected together with the spreading sequence used by the specific user as spreading sequences of the spreading sequence group for the user group.

For example, for a specific sequence in the spreading sequence set, correlations between other sequences of the spreading sequence set and the specific sequence may be obtained respectively, and a sequence with a low correlation with the specific sequence is selected together with the specific sequence to form a spreading sequence group for one user group.

In the above examples, since the differences between the received powers of the respective user groups are large enough, the receiving end may ignore signals transmitted by mobile stations of user groups with low received powers when decoding, and extract signals transmitted by mobile stations of user groups with high received powers. Therefore, when spreading sequences are selected, it is merely considered that correlations between spreading sequences included in a spreading sequence group for one user group are low, and effect from spreading sequences included in spreading sequence groups for other user groups may be ignored.

On the other hand, when the differences between the received powers of the respective user groups at the receiving end are less than or equal to the predetermined value, since the differences between the received powers of the respective user groups may not be large enough, the receiving end cannot ignore signals transmitted by mobile stations of user groups with low received powers when decoding. Therefore, when spreading sequences are selected, effect from spreading sequences included in spreading sequence groups for other user groups cannot be ignored.

Specifically, when the differences between the received powers of the respective user groups at the receiving end are less than or equal to the predetermined value, the determining unit 520 may select, according to a sum of interference caused by a plurality of sequences of the spreading sequence set to users in one user group, spreading sequences of a spreading sequence group for the user group from the spreading sequence set. That is, a specific user of one user group may be configured to use a specific spreading sequence of the spreading sequence set for transmission, and according to a sum of interference caused to users of the specific user group in the case of sequences other than the specific spreading sequence of the spreading sequence set being used for transmission, spreading sequences for the user group may be selected from the spreading sequence set.

For example, for each spreading sequence in the spreading sequence set, a sum of interference of the other sequences of the spreading sequence set on the spreading sequence may be obtained, and according to a received power of the user group at the receiving end and the sum of interference, spreading sequences of a spreading sequence group for the user group may be determined. For example, a user group with a large received power at the receiving end may be allocated with a spreading sequence on which a sum of interference of the other sequences of the spreading sequence set is small.

According to one example of the present disclosure, the specific spreading sequence of the spreading sequence set configured to be used by the specific user of one user group may be a spreading sequence selected from spreading sequences obtained by excluding spreading sequences for user groups with higher received powers than this user group from the spreading sequence set. That is, preferably, in this example, spreading sequences for user groups are selected sequentially in order of received powers from large to small. For any user group, selection may be made from spreading sequences in the spreading sequence set other than spreading sequence groups for user groups with higher received powers than the user group. Furthermore, when the sum of interference caused by a plurality of sequences of the spreading sequence set to users in one user group is determined, preferably, only a sum of interference on one specific sequence from spreading sequences other than spreading sequence groups for user groups with higher received powers than the user group may be determined.

According to one example of the present disclosure, the number of mobile stations included in each user group is the same, and the number of spreading sequences included in each spreading sequence group is the same. Alternatively, according to another example of the present disclosure, the number of mobile stations included in a user group with a low received power at the receiving end may be greater than the number of mobile stations included in a user group with a high received power at the receiving end, accordingly, a spreading sequence group for a user group with a low received power may include more spreading sequences than a spreading sequence group for a user group with a high received power.

In the examples described above in conjunction with FIG. 5, by grouping mobile stations with received powers at the receiving end, power differences between user groups may be utilized more effectively when received information is decoded at the receiving end, thereby improving reception performance.

Furthermore, according to another embodiment of the present disclosure, a transmission power of a mobile station may also be adjusted to control a received power of information transmitted by the mobile station at the receiving end, thereby further improving performance of a receiver.

Figure 6:
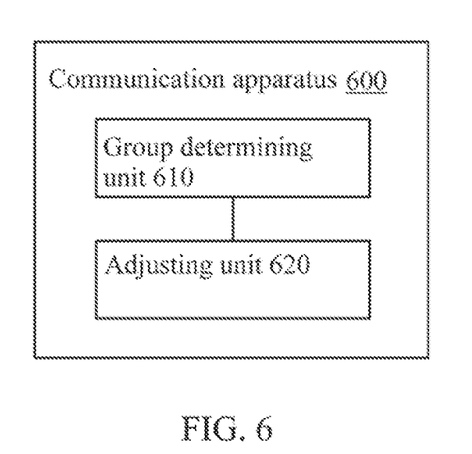
FIG. 6 is a block diagram illustrating a communication apparatus according to another embodiment of the present disclosure.

A communication apparatus according to another embodiment of the present disclosure will be described below with reference to FIG. 6. In the embodiment according to the present disclosure, the communication apparatus may be a mobile station, a base station, or the like. FIG. 6 is a block diagram illustrating a communication apparatus 600 according to one embodiment of the present disclosure. As shown in FIG. 6, the communication apparatus 500 comprises a group determining unit 610 and an adjusting unit 620. The communication apparatus 600 may comprise other components in addition to these two units, however, since these components are not related to the content of the embodiments of the present disclosure, illustration and description thereof are omitted herein. Furthermore, since specific details of the following operations performed by the communication apparatus 600 according to the embodiment of the present disclosure are the same as those described above with reference to FIGS. 2-4 and Formulas 3-6, repetitive description of the same details are omitted herein to avoid repetition.

As shown in FIG. 6, the group determining unit 610 may determine, according to a reference signal received power (RSRP) of a mobile station, a user group to which the mobile station belongs. According to one example of the present disclosure, a path loss of the mobile station may be determined according to the reference signal received power of the mobile station. Then, the user group to which the mobile station belongs is determined according to the path loss.

Furthermore, when the user group to which the mobile station belongs is determined, the group determining unit 610 may not consider or may consider received powers of respective user groups at a receiving end. Herein, a received power of a user group at the receiving end may be a preconfigured received power that information transmitted by mobile stations of the user group should achieve at the receiving end. For example, when a mobile station determines, according to RSRP, that a received power of a specific user group of a plurality of user groups at the receiving end can be achieved, the group determining unit 610 may determine that the mobile station belongs to the specific user group. As another example, when a mobile station determines, according to RSRP, that received powers of two or more user groups of a plurality of user groups at the receiving end can be achieved, the group determining unit 610 may select one user group from the two or more user groups as the particular user group the mobile station belongs to.

Then, the adjusting unit 620 may adjust the transmission power of the mobile station according to a received power of the determined user group at the receiving end. According to one example of the present disclosure, the method shown in FIG. 2 may be used for a base station, that is, the base station controls transmission powers of respective mobile stations connected to the base station. As shown in FIG. 2, the base station may determine a user group to which one UE belongs according to a reference signal received power of the UE, or according to a reference signal received power of the UE and received powers of other mobile stations connected to the base station, and generate power adjustment information for indicating to adjust the transmission power of the mobile station according to the determined user group. The mobile station receives the power adjustment information from the base station, and adjusts its transmission power according to the received power adjustment information.

According to another example of the present disclosure, the method shown in FIG. 2 may be used for a mobile station, that is, the mobile station controls its own transmission power according to its reference signal received power (RSRP). As shown in FIG. 2, the UE may determine a user group to which the UE belongs according to its reference signal received power, and adjust its transmission power according to the determined user group.

Furthermore, according to another example of the present disclosure, the adjusting unit 620 may adjust the transmission power of the mobile station by one or more parameters such as a group adjustment power, a mobile station adjustment power, a path loss compensation factor, a correction factor, and power adjustment information. For example, in order to realize received powers that respective user groups should achieve at the receiving end, the adjusting unit 620 may determine a group adjustment power for each user group to adjust transmission powers of mobile stations in the user group. The example of determining a group adjustment power $P_{0\_Group}$ for a specific group n has been described above with reference to FIGS. 3-4 and Formula 3, which will not be repeatedly described herein.

In addition to adjusting the transmission power of the mobile station based on the group adjustment power described above, the transmission power of the mobile station may be further adjusted by a mobile station adjustment power based on a path loss of the mobile station itself. According to one example of the present disclosure, the adjusting unit 620 may determine a mobile station adjustment power according to the path loss of the mobile station, and then adjust the transmission power of the mobile station according to the mobile station adjustment power. For example, the mobile station adjustment power $P_{0\_UE}$ may be determined by the above Formula 4.

Furthermore, according to another example of the present disclosure, the adjusting unit 620 may adjust the transmission power of the mobile station according to the path loss compensation factor. Specifically, the adjusting unit 620 may determine the path loss compensation factor for the mobile station according to the received power of the user group to which the mobile station belongs at the receiving end and the path loss of the mobile station. Then, the transmission power of the mobile station is adjusted according to the path loss compensation factor. For example, the path loss compensation factor $\alpha$ may be determined by the above Formula 5. Furthermore, according to one example of the present disclosure, $\alpha$ may be continuously varied within a range of [0, 1]. Alternatively, a value set of a may also be preconfigured. The adjusting unit 620 may select within a determined value set of $\alpha$ (for example, by Formula 5) to obtain the final value of $\alpha$. According to one example of the present disclosure, a same value set of $\alpha$, for example, {0, 0.1, 0.2, 0.3, 0.4, 0.5, 0.6, 0.7, 0.8, 0.9, 1} may be set for all users. Alternatively, different value sets of a may be set for different user groups. For example, for cell-center user groups, the value set of $\alpha$ may be set as {0, 0.1, 0.2, 0.3, 0.4, 0.5, 0.6}, for cell-edge user groups, the value set of a may be set as {0, 0.1, 0.2, 0.3, 0.4, 0.5, 0.6, 0.7, 0.8, 0.9, 1}, and for the remaining users, the value set of $\alpha$ may be set as {0, 0.1, 0.2, 0.3, 0.4, 0.5, 0.6, 0.7, 0.8}.

Furthermore, according to another example of the present disclosure, the communication apparatus may further comprise an obtaining unit. The obtaining unit may obtain a received power of a user group adjacent to the user group to which the mobile station belongs at the receiving end. The adjusting unit 620 may adjust the transmission power of the mobile station according to the received power of the determined user group at the receiving end and the path loss of the mobile station. For example, for a given nominal power and a given path loss compensation factor, a correction factor may be determined according to the received power of the determined user group at the receiving end and the path loss of the mobile station to adjust the transmission power of the mobile station.

Furthermore, according to another example of the present disclosure, the base station may also transmit power adjustment information to the UE according to a situation of the UE, to further adjust the transmission power of the UE. Specifically, in the case that the communication apparatus is a mobile station, it may further comprise a receiving unit to receive the power adjustment information transmitted by the base station. The adjusting unit 620 may adjust the transmission power of the mobile station according to the power adjustment information.

In the examples described above in conjunction with FIG. 6, by adjusting the transmission power of the mobile station according to received powers of user groups at the receiving end, power differences between user groups may be utilized more effectively when the receiving end decodes received information by means of Successive Interference Cancellation (SIC), maximum likelihood, Message Passing Algorithms (MPAs) and the like, thereby improving reception performance.

<Hardware Structure>

Figure 7:
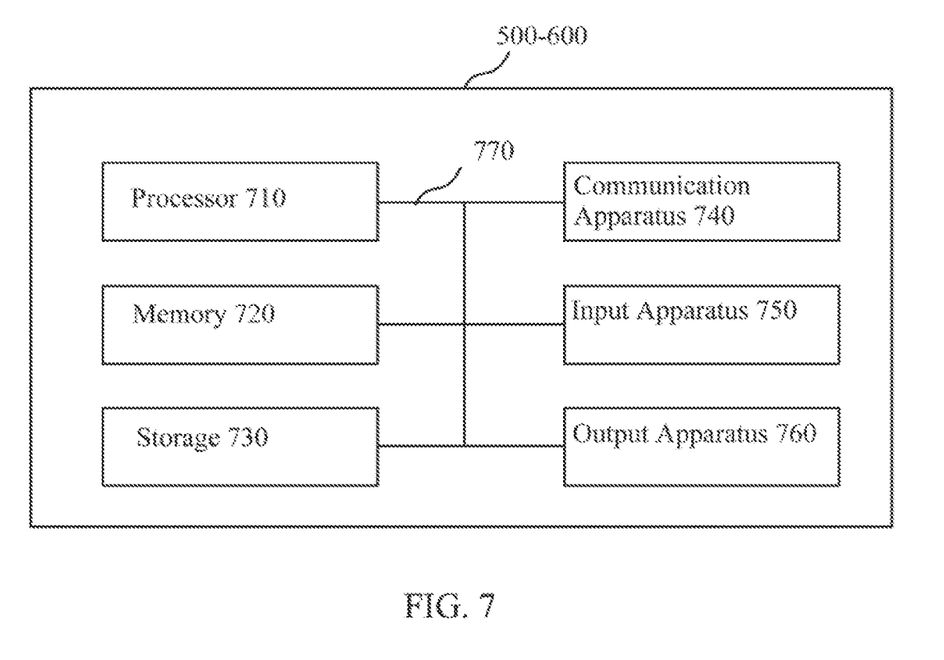
FIG. 7 is a diagram illustrating one example of a hardware structure of a communication apparatus involved in one implementation of the present disclosure.

The base station, the user terminal and the like in one embodiment of the present disclosure may function as a computer that executes the processes of the wireless communication method of the present disclosure. FIG. 7 is a schematic diagram illustrating an example of a hardware structure of a communication apparatus involved in one embodiment of the present disclosure. Any of the above communication apparatuses 500 and 600 may be constituted as a computer apparatus that physically comprises a processor 710, a memory 720, a storage 730, a communication apparatus 740, an input apparatus 750, an output apparatus 760, a bus 770 and the like In addition, in the following description, terms such as "apparatus" may be replaced with circuits, devices, units, and the like. The hardware structure of any of the above communication apparatuses 500 and 600 may include one or more of the respective apparatuses shown in the figure, or may not include a part of the apparatuses.

For example, only one processor 710 is illustrated, but there may be multiple processors. Furthermore, processes may be performed by one processor, or processes may be performed by more than one processor simultaneously, sequentially, or by other methods. In addition, the processor 710 may be installed by more than one chip.

Respective functions of any of the above communication apparatuses 500 and 600 may be implemented, for example, by reading specified software (program) on hardware such as the processor 710 and the memory 720, so that the processor 710 performs computations, controls communication performed by the communication apparatus 740, and controls reading and/or writing of data in the memory 720 and the storage 730.

The processor 710, for example, operates an operating system to control the entire computer. The processor 710 may be constituted by a Central Processing Unit (CPU), which includes interfaces with peripheral apparatuses, a control apparatus, a computing apparatus, a register and the like. For example, the obtaining unit 510, the determining unit 520, the group determining unit 610, the adjusting unit 620 and the like described above may be implemented by the processor 710.

In addition, the processor 710 reads programs (program codes), software modules and data from the storage 730 and/or the communication apparatus 740 to the memory 720, and execute various processes according to them. As for the program, a program causing computers to execute at least a part of the operations described in the above embodiments may be employed.

The memory 720 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 720 may also be referred to as a register, a cache, a main memory (a main storage apparatus) and the like. The memory 720 may store executable programs (program codes), software modules and the like for implementing wireless communication methods related to one embodiment of the present disclosure.

The storage 730 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 730 may also be referred to as an auxiliary storage apparatus.

The communication apparatus 740 is a hardware (transceiver device) performing communication between computers via a wired and/or wireless network, and is also referred to as a network device, a network controller, a network card, a communication module and the like, for example. The communication apparatus 740 may include a high-frequency switch, a duplexer, a filter, a frequency synthesizer and the like to implement, for example, Frequency Division Duplex (FDD) and/or Time Division Duplex (TDD). For example, the receiving unit and the like described above may be implemented by the communication apparatus 740.

The input apparatus 750 is an input device (e.g., a keyboard, a mouse, a microphone, a switch, a button, a sensor and the like) that receives input from the outside. The output apparatus 760 is an output device (e.g., a display, a speaker, a Light Emitting Diode (LED) light and the like) that performs outputting to the outside. In addition, the input apparatus 750 and the output apparatus 760 may also be an integrated structure (e.g., a touch screen).

Furthermore, the respective apparatuses such as the processor 710 and the memory 720 are connected by the bus 770 that communicates information. The bus 770 may be constituted by a single bus or by different buses between the apparatuses.

Furthermore, any of the above communication apparatuses 500 and 600 may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 710 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

In addition, a radio frame may be composed of one or more periods (frames) in the time domain. Each of the one or more periods (frames) constituting the radio frame may also be referred to as a subframe. Further, a subframe may be composed of one or more slots in the time domain. The subframe may be a fixed length of time duration (e.g., 1 ms) that is independent of the numerology.

Furthermore, a slot may be composed of one or more symbols (OFDM (Orthogonal Frequency Division Multiplexing) symbols, SC-FDMA (Single Carrier Frequency Division Multiple Access) symbols, etc.) in the time domain. Furthermore, the slot may also be a time unit based on the numerology. Furthermore, the slot may also include a plurality of microslots. Each microslot may be composed of one or more symbols in the time domain. Furthermore, a microslot may also be referred to as a "subframe".

A radio frame, a subframe, a slot, a microslot and a symbol all represent a time unit during signal transmission. A radio frame, a subframe, a slot, a microslot and a symbol may also use other names that correspond to them, respectively. For example, one subframe may be referred to as a "transmission time interval (TTI)", a plurality of consecutive subframes may also be referred to as a "TTI", and one slot or one microslot may also be referred to as a "TTI." That is, a subframe and/or a TTI may be a subframe (1 ms) in the existing LTE, may be a period of time shorter than 1 ms (e.g., 1 to 13 symbols), or may be a period of time longer than 1 ms. In addition, a unit indicating a TTI may also be referred to as a slot, a microslot and the like instead of a subframe.

A radio frame, a subframe, a slot, a microslot and a symbol all represent a time unit during signal transmission. A radio frame, a subframe, a slot, a microslot and a symbol may also use other names that correspond to them, respectively. For example, one subframe may be referred to as a □transmission time interval (TTI)□, a plurality of consecutive subframes may also be referred to as a □TTI□, and one slot or one microslot may also be referred to as a □TTI.□That is, a subframe and/or a TTI may be a subframe (1 ms) in the existing LTE, may be a period of time shorter than 1 ms (e.g., 1 to 13 symbols), or may be a period of time longer than 1 ms. In addition, a unit indicating a TTI may also be referred to as a slot, a microslot and the like instead of a subframe.

Herein, a TTI refers to the minimum time unit of scheduling in wireless communication, for example. For example, in LTE systems, a wireless base station performs scheduling for respective user terminals that allocates radio resources (such as frequency bandwidths and transmission power that can be used in respective user terminals) in units of TTI. In addition, the definition of the TTI is not limited thereto.

The TTI may be a transmission time unit of channel-coded data packets (transport blocks), code blocks, and/or codewords, or may be a processing unit of scheduling, link adaptation and so on. In addition, when the TTI is given, a time interval (e.g., the number of symbols) mapped to transport blocks, code blocks, and/or codewords actually may also be shorter than the TTI.

In addition, when one slot or one microslot is called a TTI, more than one TTI (i.e., more than one slot or more than one microslot) may also become the minimum time unit of scheduling. Furthermore, the number of slots (the number of microslots) constituting the minimum time unit of the scheduling may be controlled.

A TTI having a time duration of 1 ms may also be referred to as a normal TTI (TTI in LTE Rel. 8-12), a standard TTI, a long TTI, a normal subframe, a standard subframe, or a long subframe, and so on. A TTI that is shorter than a normal TTI may also be referred to as a compressed TTI, a short TTI, a partial (or fractional) TTI, a compressed subframe, a short subframe, a microslot, a subslot, and so on.

In addition, a long TTI (e.g., a normal TTI, a subframe, etc.) may also be replaced with a TTI having a time duration exceeding 1 ms, and a short TTI (e.g., a compressed TTI, etc.) may also be replaced with a TTI having a TTI duration shorter than the long TTI and longer than 1 ms.

A resource block (RB) is a resource allocation unit in the time domain and the frequency domain, and may include one or more consecutive subcarriers in the frequency domain. Also, an RB may include one or more symbols in the time domain, and may be one slot, one microslot, one subframe or one TTI duration. One TTI and one subframe may be composed of one or more resource blocks, respectively. In addition, one or more RBs may also be referred to as "physical resource blocks (PRBs (Physical RB s))", "Sub-Carrier Groups (SCGs)", "Resource Element Groups (REGs)", "PRG pairs", "RB pairs" and so on.

Furthermore, a resource block may also be composed of one or more resource elements (REs). For example, one RE may be a radio resource area of one subcarrier and one symbol.

In addition, structures of the radio frames, subframes, slots, microslots and symbols, etc. described above are simply examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration may be variously altered.

Furthermore, the information, parameters and so on described in this specification may be represented in absolute values or in relative values with respect to specified values, or may be represented by other corresponding information. For example, radio resources may be indicated by specified indices. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limited in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a control table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Furthermore, notification of prescribed information (for example, notification of □being X□) is not limited to being performed explicitly, and may be performed implicitly (for example, by not performing notification of the prescribed information or by notification of other information).

Decision may be performed by a value (0 or 1) represented by 1 bit, or by a true or false value (boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The base station is sometimes referred to as terms such as a fixed station, a NodeB, an eNodeB (eNB), an access point, a transmitting point, a receiving point, a femto cell, a small cell and the like.

The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may also be applied. Also, the user terminal in this specification may be replaced with a wireless base station.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM® (Global System for Mobile communications), CDMA 2000, UMB (Ultra Mobile Broadband), IEEE 802.11 (Wi-Fi®), IEEE 802.16 (WiMAX®), IEEE 802.20, UWB (Ultra-WideBand), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A terminal comprising a memory and one or more processors coupled to the memory, the one or more processors configured to:
    obtain received powers of a plurality of user groups at a receiving end;
    determine, according to the obtained received powers, spreading sequence groups for the user groups in a spreading sequence set.

2. The terminal of claim 1, wherein the one or more processors are further configured to determine, according to interference caused by respective sequences of the spreading sequence set to users of one user group, respectively, a spreading sequence group for the one user group from the spreading sequence set when differences between the received powers of the respective user groups at the receiving end are greater than or equal to a predetermined value.

3. The terminal of claim 1, wherein the one or more processors are further configured to determine, according to a sum of interference caused by a plurality of sequences of the spreading sequence set to users in one user group, a spreading sequence group for the one user group from the spreading sequence set when differences between the received powers of the respective user groups at the receiving end are less than or equal to a predetermined value.

4. A base station comprising a memory and one or more processors coupled to the memory, the one or more processors configured to:
    obtain received powers of a plurality of user groups at a receiving end;
    determine, according to the obtained received powers, spreading sequence groups for the user groups in a spreading sequence set.

5. The base station of claim 4, wherein the one or more processors are further configured to determine, according to interference caused by respective sequences of the spreading sequence set to users of one user group, respectively, a spreading sequence group for the one user group from the spreading sequence set when differences between the received powers of the respective user groups at the receiving end are greater than or equal to a predetermined value.

6. The base station of claim 4, wherein the one or more processors are further configured to determine, according to a sum of interference caused by a plurality of sequences of the spreading sequence set to users in one user group, a spreading sequence group for the one user group from the spreading sequence set when differences between the received powers of the respective user groups at the receiving end are less than or equal to a predetermined value.

* * * * *